United States Patent [19]

Sicard et al.

[11] Patent Number: 4,697,239
[45] Date of Patent: Sep. 29, 1987

[54] AUTOMATED INSTALLATION FOR PROCESSING LARGE OBJECTS

[75] Inventors: Claude Sicard, Saint Nazaire; Patrice Kroczynski, Vitry; Herve Gallard, Sollies-Pont; Denis Mars, Le Chesnay; Michel Devos, Dunkerque, all of France

[73] Assignee: Institut de Recherches de la Construction Navale, Paris, France

[21] Appl. No.: 688,890

[22] Filed: Jan. 4, 1985

[51] Int. Cl.⁴ .............................................. G06F 15/46
[52] U.S. Cl. ...................... 364/468; 364/474; 364/513; 364/192; 901/1
[58] Field of Search ............... 364/468, 474, 475, 512, 364/513, 191–193; 414/730; 901/1; 29/568

[56] References Cited

U.S. PATENT DOCUMENTS 3,409,854 5/1966 Swallert ............................. 335/289
4,237,598 12/1980 Williamson ..................... 364/474 X
4,393,450 7/1983 Jerard ................................. 364/474
4,551,810 11/1985 Levine ............................... 364/475

FOREIGN PATENT DOCUMENTS 0006339 1/1980 European Pat. Off. .
781465 8/1957 United Kingdom .

Primary Examiner—Joseph Ruggiero
Attorney, Agent, or Firm—Sandler & Greenblum

[57] ABSTRACT

An automated mobile workshop composed of a workstation equipped with at least one tool for performing work, a transporter for moving the mobile workstation from one location to another, sensors for detecting the location of the workstation with respect to the site on which work is to be performed, and a programming center for receiving and storing information relating to the objects on which work is to be performed, as well as technical specifications of the tools available to perform the work.

16 Claims, 12 Drawing Figures ated INSTALLATION FOR
PROCESSING LARGE OBJECTS

BACKGROUND OF THE INVENTION

1. Field of the Invention

The present invention relates to an automated installation for processing large objects. In particular, the present invention is directed to an automated mobile workshop which is particularly suitable for use in the construction, manufacture and fabrication of relatively large objects, such as ships, in addition to the retrofitting and the repair of such large objects.

2. Discussion of Background and Material Information

In recent years numerous types of automated workshops have been constructed or proposed for processing various objects, although shipbuilding has been relatively unaffected by these developments. The reason for this is that shipbuilding raises particular problems which are rarely, if ever, encountered in combination in other industry sectors.

One of these problems results from the size of the the particular item being manufactured retrofitted or otherwise requiring repair. The dimensions of a hull or of a section of a hull are such that it is inconceivable to convey it into the vicinity of consecutive processing robots. Accordingly, it is rather the robots which must be moved into a working position. Another problem relating to the ship building industry results from the fact that the tasks to be carried out are generally not particularly repetitive. Consider a section of a hull of a ship, which is composed of a certain number of cells or chambers delimited by longitudinal or transverse bulkheads, each cell resembling its neighbours but generally differing from them. In contrast to boats, ships are such a larger scale that they are almost always custom-built and, therefore, it is rare for two or more ships to be strictly identical. Because of this, a system of automated functions and method of organisation which automated only strictly repetitive tasks would fail to take care of an unacceptable proportion of the work involved.

SUMMARY OF THE INVENTION

An object of the present invention is to provide an automated installation which is capable of processing, i.e., manufacturing, retrofitting, repairing and replacing certain items of reltively large objects without moving them, which because of their size, shape or the processing that they are to undergo are, generally speaking, not strictly identical, although there may be similarities between them.

A further object of the present invention is to provide an installation of this kind which includes a workshop in which tools may be moved over great distances, whether operating or not, but with a precision and working speed comparable using those achieved with an installation in which tools are moved over short distances only.

Another object of the invention is to have a plurality of tools which function simultaneously and automatically.

It is another object of the present invention to provide an installation for automatic construction, manufacture, repair, and/or other processing and handling of objects of a similar but not necessarily identical kind without moving such objects, which may be assembled into groups. The installation is characterised in that it is composed of:

(a) a workshop equipped with means for performing certain functions such as tools, which may be robots, transport means adapted to move such tools and location and follower sensors adapted to monitor the environment of the tools;

(b) a programming centre adapted to receive and store information concerning the objects to be constructed manufactured, repaired, and the like, and/or the processing to be carried out on them, to receive and store technical specifications regarding the tools available, so as to be able to construct, on the basis of such information and such specifications, a program of operation with respect to one of such objects, to display said program for checking and, where necessary, correction, to proceed similarly for a program relating to another object or for a program for assembling objects, ad to store the programs, the programming centre is also adapted to establish a program for moving tools from one part to another, to check the program and to store it; and (c) a supervisory station adapted to receive programs from the programming centre, to detect the presence of tools and time necessary for their execution, to communicate instructions contained in such programs to the tools and transport means, and to check such means to confirm their proper operation.

As will be understood from what has been previously mentioned, the installation is particularly advantageous in the situation where it forms part of a shipyard, the objects being cells or chambers of a ship and the groups of objects being blocks which make up one part of a ship under construction.

A still further object of the present invention is the prevention of a programming centre composed of:

(a) a "geometric" database which receives via an interface data relating to objects to be fabricated or processed, (b) a "tool" database which contains a description of the capability of the tools, (c) a "working parameters" database which contains working standards, (d) a "work preparation" station which can extract required data from the aforementioned previously identified three databases to prepare a work sequence corresponding to an object, which is equipped with execution means with visual simulation facilitates and which can also prepare a work sequence for a group of objects, (e) a "work sequence" database capable of receiving a work sequence from the work preparation station and of returning it on demand to the work preparation station, (f) a "statistical control" database also capable of two-way interchange with the work preparation station, and (g) a group work sequence database capable of receiving a work sequence of this kind prepared by the work station and transmitting it to the supervisory station.

The supervisory station preferably comprises a slave microprocessor linked to a master microprocessor which forms part of the programming centre.

Another further object of the present invention is to provide a workshop served by a travelling overhead crane, gantry crane or like lifting beam and is equipped with at least one robot formed by an articulated arm having a plurality of axes of rotation and/or sliding linkages each provided with drive means, one end of said arm being connectable to a tool for processing or inspecting a part, the other end of said arm being connected to a robot carrier provided with disconnectable grasping means adapted to provide a direct mechanical link to the object to be processed or inspected, and means for providing a mechanical link between the carrier and the lifting beam so as to enable the carrier with the arm to be moved from place to place in the workshop. The workshop also includes control and power supply means for the drive means and the tool and means for connecting the control and power supply means to the drive means. In addition, the The means for linking carrier to the lifting beam are disconnectable grasping means distinct from the means providing a direct mechanical link to the object to be processed.

By "travelling overhead crane, gantry crane or like lifting beam" is meant a mobile unit which provides for taking up an object in the workshop, transferring it at high speed to another point in the workshop and leaving it at this other point. Of mobile units conforming to this definition, travelling overhead cranes are the most commonly encountered. Nevertheless, also including within such terms are various other devices, such as gantry cranes, wall cranes, travelling cranes and various types of transporter machine. In one particular embodiment, a gantry crane includes a tool-carrier rack as well as a robot/carrier combination preparation and control catwalk, in which case, the lifting tackle of the travelling overhead crane is advantageously replaced by pivotted and/or sliding rigid metal profiled members. For reasons of simplification, in the present document all such forms of device are referred to as "lifting beams".

The device in accordance with the invention offers the same advantages with regard to speed and accuracy during the times when the tool is in operation as a robot system having the same characteristics as the assembly consisting of the robot arm and its carrier, except that it has the displacement amplitude and speed properties conferred by the lifting beam during the transport periods.

The direct mechanical connection of the carrier, for example to the lifting beam, may be effected by simply using the hook conventionally suspended from the mobile carriage of the lifting beam if the latter is provided with hook. Nevertheless, this particular arrangement poses some problems. In this regard, it is currently possible to position the hook lengthwise and transversely of the workshop as well as in height with a high degree of accuracy, of the order of 0.1 m, from the control cab. Nevertheless in most cases the orientation of the hook is not controllable from the control cab. The hook is linked to the beam of the crane by a cable with one or two strands, more often than not with a vertical axis pivot interposed, so that human intervention is required if it is necessary to orient the load carried by the hook in a precise manner, as is the case here. Even if this vertical articulation is eliminated, the hook is subjected to oscillation around a vertical axis due to the low return torque of the cable. It is difficult to control these movements from the control cab of the lifting beam, which means that it is difficult to put down the carrier with a predetermined orientation.

According to one beneficial aspect of the present invention, the means designated "holders" provided on the lifting beam to cooperate with the corresponding grasping means provided on the carrier are connected to the remainder of the lifting beam by crossed cables or by a vertical cable which carries the load, and in this embodiment, the holder is provided with a stabilizer which includes a horizontal axis gyroscope and means for rotating the holder about a vertical axis relative to the stabilizer in order to bring the holder into the required orientation. Insofar as the grasping of the carrier is concerned, the holder may be "passive" and consist, for example, of a hook, and in this case the grasping means carried by the carrier are "active", formed, for example, by clamps with jaws which move apart for disconnection. However, it is preferable for the control cab of the lifting beam to have simultaneous control over the means for rotating the holder and over the holder itself, the latter being of the "active" type in the sense as indicated hereinabove.

Another important point for proper operation of the workshop concerns the linking means connecting the control and power supply means to the robot arm. It will be understood that these linking means may impede movement of the lifting beam if they are continuously connected to the power supply and control means and to the robot arm. On the other hand, manual manipulation of the linking means in order to disconnect and reconnect them on each movement of the lifting beam represents a considerable and potentially dangerous task. For this reason, the holder is made up of two disconnectable elements, and one of these two elements is composed of one or more winders adapted to receive the power supply and/or control means for the robot arm, the linking means being themselves disconnectable at one point at least.

Another problem occurs in connection with the nature of the linking means themselves, especially when the tool is an electrical welding torch employing currents of several hundred ampères, as is frequently the case nowadays with automatic welding. The interference caused by these currents subject to sudden variations is of a kind producing serious corruption of control and information signals. Robot manufacturers are always wary of such phenomena. In accordance with the present invention, therefore, it is provided that one robot/carrier combination be at work while another combination, in the near vicinity, is being made ready, in particular during initialisation and recognition of joints, which are tasks entailing a significant flow of information. In an industrial environment it would be virtually impossible to guarantee that the radiation occurring on striking the arc in one was not transmitted to the other. In this case, it is preferred to provide for the linking means to include, in addition to the cable or cables carrying the welding current, a set of optical fibres which constitute a bus, coders-decoders being provided at the ends of the linking means to convert optical signals into electronic signals and vice versa.

This approach paves the way for further simplification of the structure of the workshop. Using this approach, all the computer control and program means for storage are combined in a single processor colocated with the power supply and/or control means this permits combination formed by the robot and its carrier essentially to be composed of only said coders-decoders, and the necessary electrical or mechanical means and their direct control lines connected to said coders-decoders. In this way there is obtained a central control computer which may be located in an easy access area. Accordingly, the maintenance of the system is relatively simple and easy, preferably at the supervisory station or in the immediate vicinity of the latter. The carrier and robot arm are simplified and lightened since they contain a minimum of electronics. This facilitates movement and maintenance and minimizes, the risk of human intervention being required within the workshop. Moreover, the control loops will be processed by the single processor which enables two robots to work together on a common task without having to transfer trajectory synchronisation information.

BRIEF DESCRIPTION OF THE DRAWINGS

The invention will now be described in more detail by means of a non-limiting practical embodiment of the invention relating to a shipyard equipped with robots for welding prefabricated block units of a ship. This embodiment is illustrated by the drawings, in which.

DETAILED DESCRIPTION

For reasons of clarity the installation will be described in the opposite order to that adopted hereinabove, that is to say beginning with the workshop and ending with the programming centre.

Figure 1:
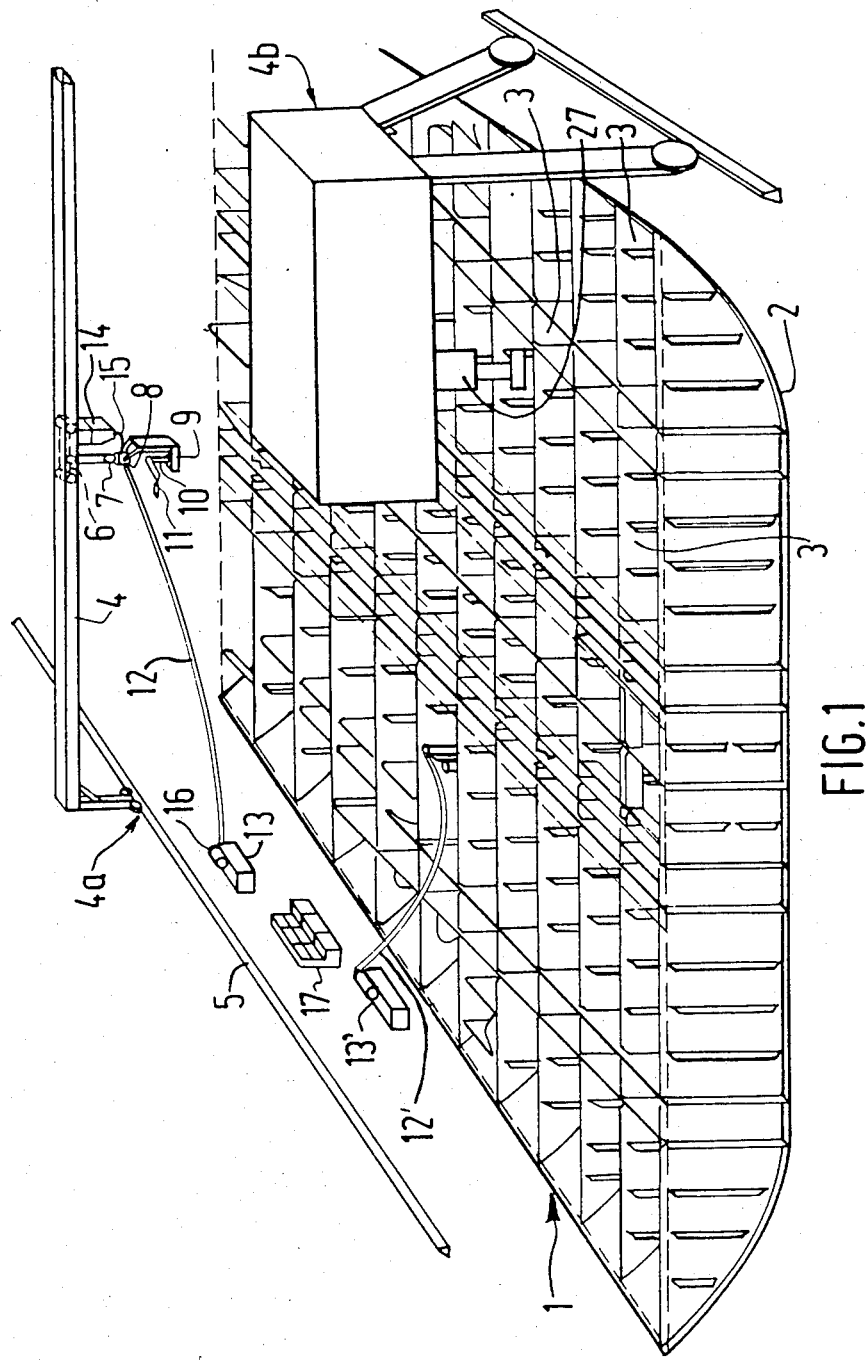
FIG. 1 is a schematic overall view in perspective of the workshop.
Figure 2:
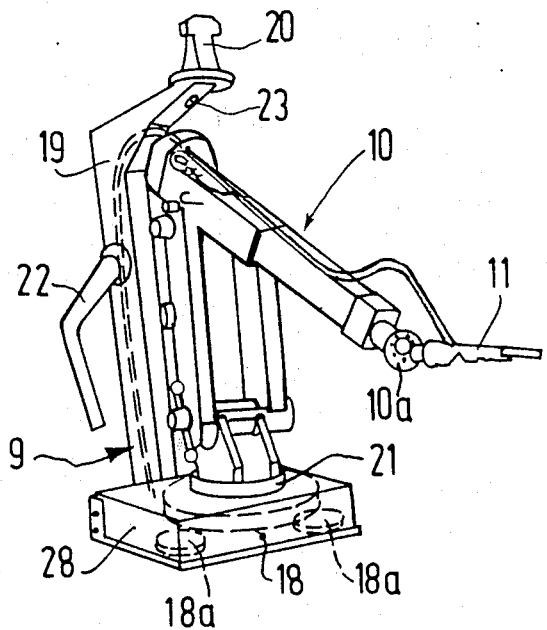
FIG. 2 is a view in perspective of a robot/carrier combination.

FIG. 1 is a schematic representation of a robot-equipped workshop with a ship under construction. Only a fragment 1 of the ship is shown in the form of a prefabricated hull block 2. A certain number of longitudinal 3a and transverse 3b stiffening bulkheads divide the space into a number of compartments 3 of varying shape and size. A lifting beam 4 of a travelling overhead crane 4a or gantry crane 4b moves on two parallel rails 5. Only part of these means has been shown in FIG. 1. The beam 4 carries a carriage 6 provided with a pulley block 7 equipped with a hook 32 shown in more detail in FIG. 9, which supports a holder 8 to which the carrier 9 may be attached. A robot 10 resembling the shape of an articulated arm is attached to the carrier and is equipped with a tool 11, which is illustrated in FIG. 2 as a welding torch. The robot arm 10 is connected by an umbilical cable 12 to a welding current generator 13. The umbilical cable 12 comprises a conductor for the welding current, an optical fibre which constitutes the information transmission bus 109, and two electrical conductors for supplying power to the motors 103 shown schematically in FIG. 11. The optical bus 109 of the welding generators 13 is connected to the supervisory station (which comprises the front-end processor 115) installed in a control room. The movements of the beam 4, the carriage 6 and the pulley block 7 are controlled from the control cab 14. The holder 8 is also controlled from the cab 14 through the intermediary of transmission means symbolically represented at 15. As shown schematically in FIGS. 4 to 8, when the carrier 9 is lifted by the holder 8, as shown in FIG. 1, the cable 12 is unplugged and wound onto the winder 16. FIG. 1 also shows a tool or carrier exchange station 17.

Figure 3:
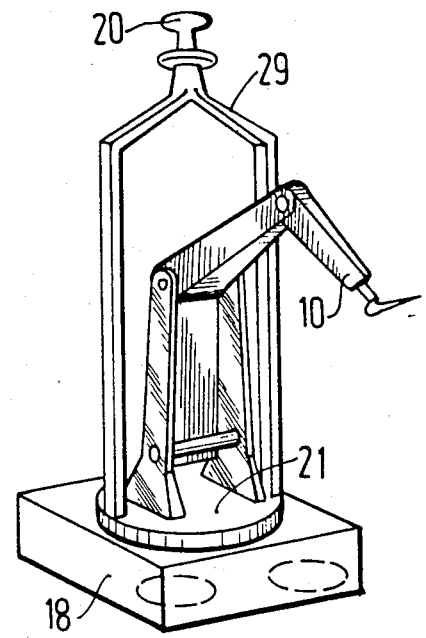
FIG. 3 is a view in perspective of another robot/carrier combination.

FIG. 2 shows a robot/carrier combination formed by a fixed class robot arm 10 and its carrier 9. The carrier 9 consists of a plate 18 provided on the bottom with electromagnets 18a for attaching it to the bottom of a compartment 3 and, on this plate 18, a fixed vertical support for beam 19 provided at its upper end with a T-shaped grasping member 20 which can cooperate with a gripping member (such as a clamp) forming part of the holder 8. The plate 18 also contains a spool of welding wire 28 in a cassette. A sheath 19a containing the welding wire passes through the beam 19 to the welding torch 11, but may instead pass inside the arm 10 in certain embodiments. The plate 18 also carries a circular base 21 to which is removably attached the robot arm 10 which can rotate on said base 21 around a vertical axis and which conventionally comprises pivots and a demountable toolholder device 11. The beam 18 is advantageously mounted so as to be able to rotate about a vertical axis, as shown in FIG. 2. To prevent the beam impeding movement of the arm, the support may be in the shape of an arch 29, as shown in FIG. 3, located to either side of the arm 10. This particular arrangement is preferred because it is a lighter solution than the single beam 19, and in this case the arch 29 rotates on the base 21. In addition, means for protecting the arm 10 are provided. In FIG. 2 protection members 22 pivot, pivotally connected to the boom or beam 19 may be moved from an advanced position, in which they protect the arm 10 against impact during handling, to a retracted position in which they do not impede movement of the rm 10. In an alternative embodiment, the protection members are replaced by a mesh bell shaped member 25 rigidly attached to the holder 8 and protecting the robot/carrier combination 9, 10 during transportation. Also provided is a connector 23 near the grasping member 20 for connection of the cable 12, fitted with a complementary connector part. Another connector is provided in the base 21 by means of which the arm 10 is rotatably mounted on the plate 18.

FIGS. 4 to 8 show the various phases of an operation to transfer the arm-carrier combination 9, 10 from one workstation to another.

Figure 4:
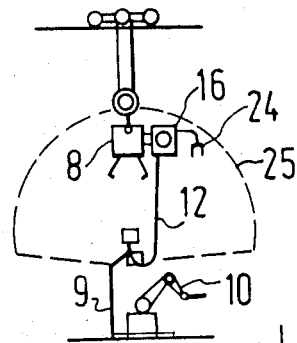
FIGS. 4 to 8 are schematics showing the implementation of the invention.

In FIG. 4 the holder 8 is shown as carrying the winder 16 on which is wound the cable 12, disconnected from the welding generator 13 but connected to the carrier 9. The holder 8 is located above the carrier 9 and is about to descend towards the latter.

Figure 5:
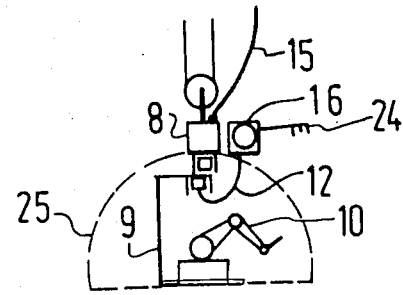
Figure 6:
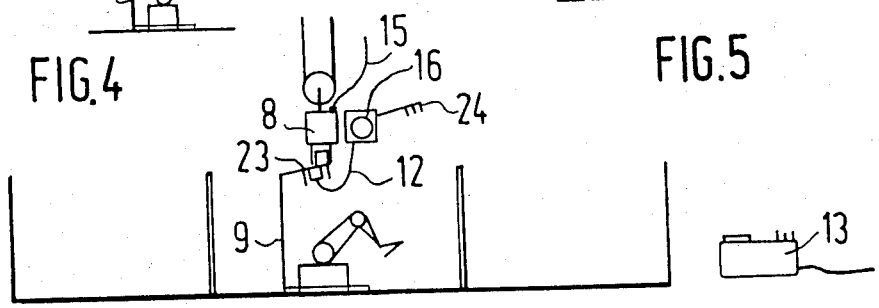

In FIG. 5 the holder 8 has been lowered as far as the carrier 9 and these two members have been fastened together. The holder 8 has subsequently been raised with the arm-carrier combination 9, 10 which is above the ground in transit towards the new workstation.

Figure 7:
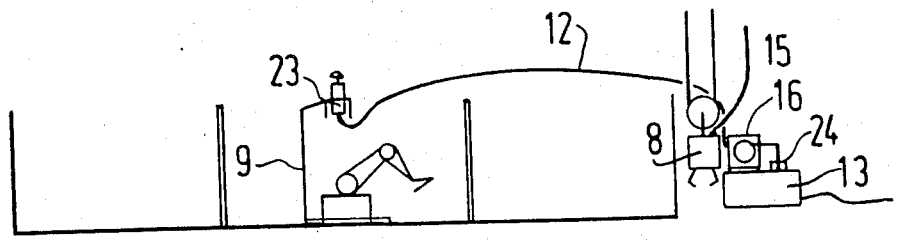

In FIG. 7 the holder 8 separated from the carrier 9 has been raised and moved to the control station, trailing behind it the cable 12 which has unwound from the winder, the latter turning freely. A connector 24 carried by the winder 16 and connected to the end of the cable 12 opposite the carrier has been plugged into the welding generator 13 so that the robot arm 10 may begin to work.

Figure 8:
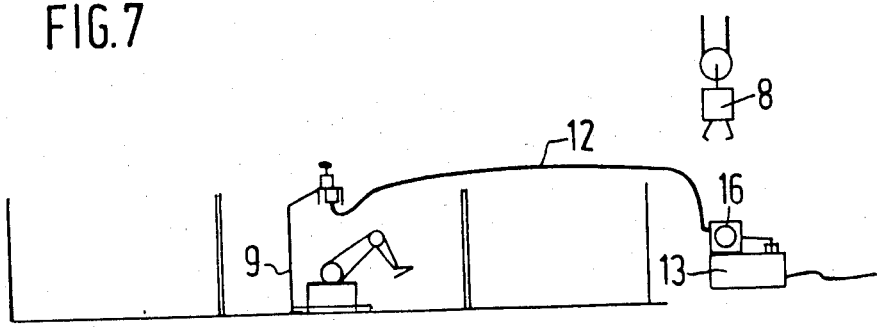

In FIG. 8, the holder has been disconnected from the winder. Because of this, the holder 8 and the crane as a whole are released for other work.

When the arm-carrier combination 9, 10 has completed its work at a predetermined workstation the holder 8 returns to take up the winder which has been or will subsequently be disconnected from the welding generator 13, and the holder 8 is then transferred into a position such as that shown in FIG. 4. It will be noted that the winder may be of the spring-loaded unrestricted rotation type. Thus the cable 12 remains under tension while the winder approaches the position shown in FIG. 4.

The welding current generator 13 is equipped to receive the winder and is adapted to be connected to the umbilical cable 12 by virtue of a frustoconical socket which widens in the upward direction and is provided with means for automatically connecting the various lines of the umbilical cable 12: optical bus, electrical power cable, protective gas hose, cooling water hose, etc. The information carried by the optical bus is transmitted to a "supervisor station" disposed in a control station and the structure of which will be described hereinafter.

In a simple version, the carrier is fixed and the only actuators provided for it are the electromagnets 18a or other means for fastening it to a workstation support surface to immobilise it at the workplace. Movements of the tool at the workstation are implemented by the robot arm only, which has the necessary degrees of freedom.

The carrier 9 may also be mobile, in which case the carrier is equipped with feet which can move stepwise and are provided by means for attaching the feet to a support surface. To ensure good quality of work it must be possible either to stop the tool during movement of the carrier 9, which is not always feasible, especially when welding, or to make small incremental movements and compensate for discontinuous movement of the carrier by appropriate movement of the robot arm, especially the wrist 10a, which constitutes a complication as far as the control means are concerned but ensures accurate results.

In preferred embodiment the carrier is composed of two parts of which one is fixed and constitutes a displacement path or rail for the other part which may then move continuously while the work is carried out. The fixed part may be a rigid beam fixed either to the bottom of a compartment 3 or to the top of two stiffener bulkheads delimiting a compartment. The fixed part may also be a flexible beam of the "BUG-O" type, marketed by the company HOBARD, which follows the supporting surface and which carries projections like a rack. These beams may be fastened by means of magnetic or suction cups or sheet metal clamps grasping projections or stiffener bulkheads, possibly, in the case of a rigid beam, with telescopic stays for positioning at a convenient height. These means for fastening means for fixing may themselves be movable, thereby providing for the displacement of a rigid beam perpendicular to its length along the top of bulkheads between compartments.

The second part of a carrier of this kind is a carriage which moves along the beam and supports the robot arm. Beams with extensions may be provided where necessary. The choice of one carrier or another is a matter for the methods office and the exchange of carriers is effected at the tool and carrier exchange station 17 at which there is a stock of interchangeable carriers of different types, for the same robot arm.

The exchange station 17 also constitutes a store for tools of different types. Of these, particular mention may be made of: an "MIG/MAG" welding torch, a "TIG" torch, devices for cutting sheet metal, preparing chamfers, removing burrs, milling, gouging, optical testing, ultrasonic testing, gamma ray testing, and like operations. As already indicated hereinabove, an optical inspection apparatus may benefit from simplified electronics VI, illustrated diagrammatically in FIG. 11.

Figure 9:
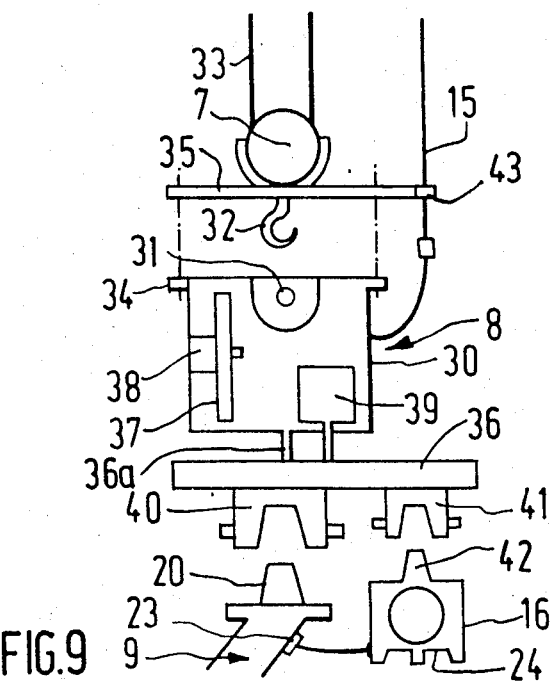
FIG. 9 is a detailed schematic of a holder and members cooperating with it.

FIG. 9 is an exploded detail schematic view of a version of the holder 8 and the members which cooperate with it. The holder 8 comprises an upper casing 30 provided with a support spindle 31 designed to cooperate with the hook 32 of the travelling overhead crane, carried by the pulley block 7 suspended from the support cable 33. The casing 30 comprises ribs 34 which are fixed by screws (not shown) to the edges of a stabiliser plate 35 attached to the pulley block 7. The casing 30 carries through the intermediary of a vertical shaft 36a a rotating plate 36. Within the casing are disposed a gyroscopic stabilizer consisting of a horizontal axis rotor 37 driven in rotation at high speed by a motor 38 and a motor-gearbox 39 which drives in rotation the plate 36. In this instance a gyroscopic stabilizer is provided, but it will be obvious that this is not the only form of stabiliser possible.

To the bottom surface of the rotating plate 36 are fixed two electromagnetically latched grasping devices 40, 41. The first is designed to cooperate with the grasping member 20 of the carrier 9, shown in more detail in FIG. 2. The second, of similar construction, is designed to cooperate with an analogous grasping member 42 attached to the winder 16. The connecting cable 12 exits the winder laterally to be run to the connector 23 carried by the beam 19 of the carrier 9. The winder 16 comprises on its base an automatically operated connector 24 so that when the winder 16 is deposited on an appropriate support on the welding generator 13 the cable 12 is automatically connected. It should be remembered that this cable includes the optical bus 109 which is connected to the central processor 115 by the connector 119 when the connector 24 is operated. The cable 12 also comprises the power supply conductors to the various actuators of the carrier and the robot arm, the welding current conductor, and hoses for protective gas, cooling fluid, and the like.

The holder 8 is supplied with power and control signals via a cable 15 connected to the cab 14 of the travelling overhead crane 4.

A disconnectable connector 43 carried by the stabilizer plate 35 provides for interrupting the link if it is required to use the hook 22, having removed the holder 8 from it.

Figure 10:
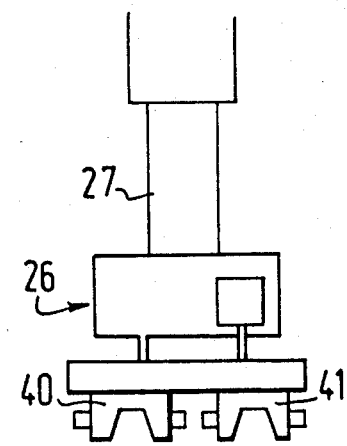
FIG. 10 is a schematic of the same holder with other members which cooperate with it.

FIG. 10 relates to alternative holder and its method of attachment. This holder 26 is connected to the carriage 6 of the lifting beam 4, not by a pulley block 7 suspended from a supporting cable 33, but rather by a telescopic rod 27, preferably of square cross-section which renders a telescopic stabilizer unnecessary. A rod 27 of this kind is shown in FIG. 1 linked to the gantry crane 4b. Also illustrated in FIG. 1 is the relatively great width of the gantry crane 4b. This is due to the fact that the tool and carrier exchange station 17 has been disposed in this gantry crane rather than at the side of the workshop. This variant provides for considerable timesaving where tool or carrier changes are frequent.

Figure 11:
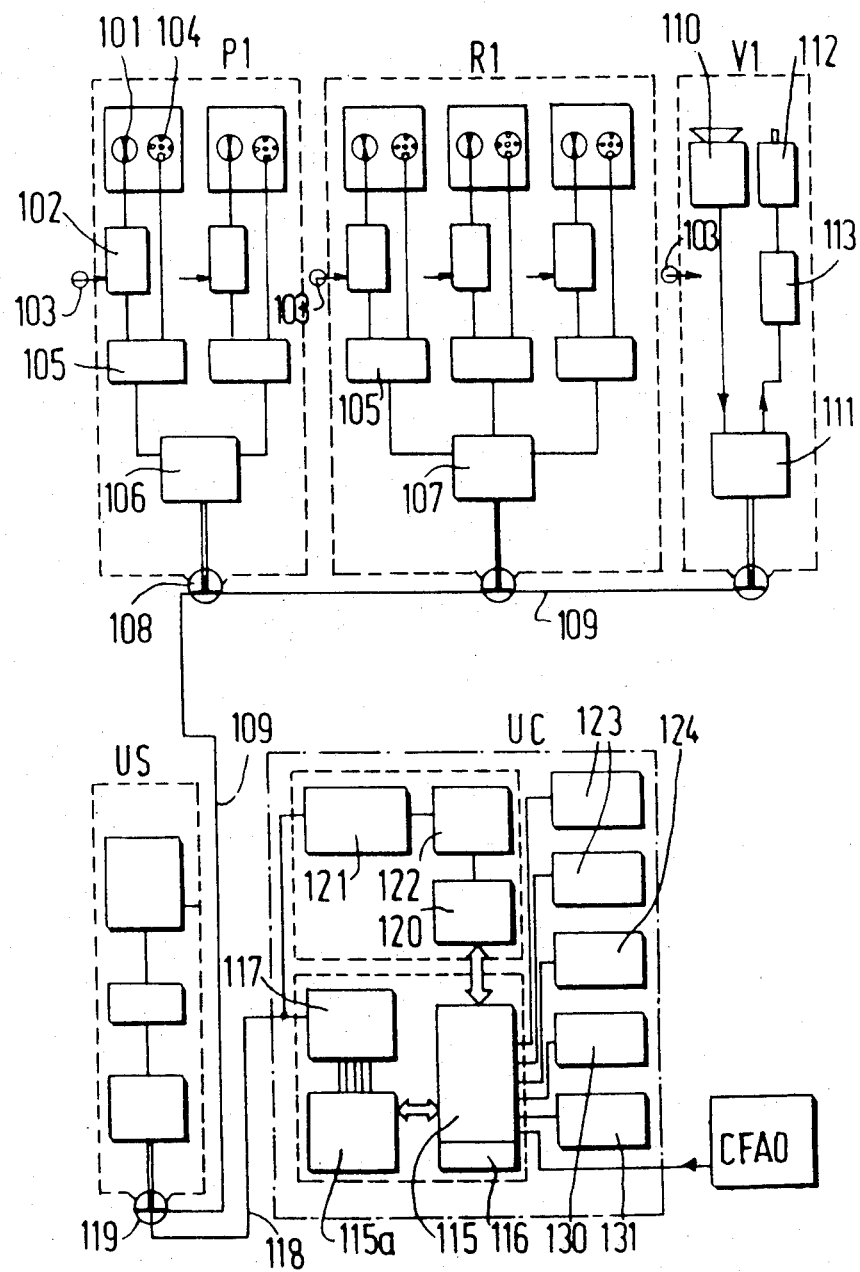
FIG. 11 is a functional block diagram of the various units of the workshop and the supervisory station.

FIG. 11 is a schematic of the opto-electronic units of a specific preferred embodiment of the installation. In this Figure the upper part of the schematic represents the mobile elements and the lower part the fixed elements. The connection between the two series of elements is provided through the intermediary of the connecting cable 12.

The mobile elements comprise a carrier element P1, a robot arm element R1 and optionally a vision element V1. The workshop is equipped with a plurality of carrier-robot combinations, so that there are a number of analogous elements like P1, R1, V1, and the like. These elements are interchangeable.

The fixed elements include the control supervisory station or "supervisor" UC and, in the case where the tool is a welding tool, a welding unit US.

The structure of the carrier element P1 and robot arm element R1 is substantially the same: for each possible movement (rotation, sliding, possibly in two directions, energisation of electromagnets, etc.), an actuator 101 controlled by a power card 102 connected to a power supply 103 and a sensor 104 are connected to an I/O interface 105 without constituting a control loop, the latter being implemented at supervisor level. This arrangement avoids interference at this sensitive location. All the interfaces of the carrier element P1 or the robot element R1 are connected to a common decoder-multiplexer-demultiplexer 106–107 which converts electrical signals to optical signals and vice versa. The optical signals pass through an optical connector 108 to an optical bus 109. The connecting cable 12 includes the optical bus 109 in its central part. It also comprises the cables supplying electrical power to the actuators. In a welding situation, the connecting cable also includes the cable carrying the welding current and possibly hoses for welding gas, cooling fluid, and the like.

The vision element V1, when provided, may include, instead of a video camera, an optical member 110 transmitting information which is sent to the optical bus 109 through an optical coder 111 without being converted into electrical signals. The element V1 also includes a laser 112 connected to a power supply 103 through an interface 113 itself connected to the optical coder 111.

The essential element of the supervisory station UC is a high-power front-end processor 115 provided with backing store 116. The processor 115 is connected through the intermediary of a set of microprocessors 115a implementing control loops to a multiplexer-demultiplexer-decoder 117 which converts the signals from the combination 115a into optical signals and vice versa and which is connected to a part 118 of the optical bus which is connected to the remainder of the optical bus 109 through an optical connector 109 which forms part of the connector 24. The front-end processor 115 is also connected to a high-speed processor 120 which processes signals from the optical member which pass through an optical demultiplexer 121 and an optical signal processing device 122.

An important feature of the present invention relates to the programming center. The information to be provided to the robot-carrier combinations originates from two different sources:

(a) external CAD/CAM system controlled by an operator), (b) local input (acquired by the robot itself at the workplace in real time; and The robot-equipped system is connected to an existing CAD/CAM database 200 which may consist of the known system designated SICEN (Systéme Informatique pour la Conception et l'Etude de Navire), which will not be further described here.

The programming centre 212 provides for modelling any type of robot, graphical simulation of its tasks, automatic programming of the tasks off-line by graphical representation and without intervention in the workshop and, finally, scheduling of all compartments of the block.

To this end, the preparer i.e., computer programmer, installed in a programming station 212 connected to the various databases, makes use of simple aids, such as high-level language, light pen, menu, and the like) (not shown) to dialogue and design tasks to be carried out by the robot. The programmer also has access to display means 208.

From the CAD/CAM database the programming centre provides all information necessary for automatic operation of the robots in the workshop.

The information obtained from the CAD/CAM database is considered as theoretical. Consequently, the work of the programming centre is no more than a theoretical design of the tasks. It is the supervisory station, therefore, which is responsible for adapting this information to the actual situation in the workshop environment.

The preparation of information defining the tasks which the robot-carrier combination performs never gives rise to a return flow of information from the supervisory station to the CAD/CAM database.

The operating instructions indispensible to the programming centre are listed under the following headings:

(a) instructions pertaining to the trajectory, geometry, speed, and displacement as the tool from one work area to another, (b) instructions pertaining to work to be executed, (c) instructions pertaining to positioning the carrier, indexing point, (d) instructions pertaining to operator intervention, operator-UFRT dialogue and, (e) miscellaneous.

The display and simulation verification means at the cell level, and designed to cover:

(a) verification of instructions and trajectories, (b) verification of work instructions, (c) verification of position instructions, (d) verification that resources available are adequate to complete task, (e) verification of consistency of all information, and (f) miscellaneous related functions.

The instructions however, may be modified.

The theoretical information defining the work sequences to be carried out by the robots is stored per block in a database with reference to which the operation is carried out. All the information is transferred onto a hard support, i.e., disk, tape, cassette), and the like, and then transmitted to the supervisory station, or it may be transmitted directly to the supervisor station.

Statistical control provides for accounting and management of work sequences, i.e., lengths of travel, times, and the like and the robot-carrier combinations in each cell.

The computer-CAD/CAM interface 202 provides for linking to any existing CAD/CAM system on the input side of the ship's structural design function. The CAD/CAM system may be the SICEN system. The modular design of this interface enables it to be adapted for other CAD/CAM systems.

The geometrical, topological and working information generated at the design stage and extracted via the interface is stored in a so-called "geometric" database 203. The entity concerned is the metal structure block.

From an alphanumeric and graphics screen 208, the operator can enter the number of the metal structure block, the elements of which are extracted from the CAD/CAM system.

The interface handles the transfer and the necessary transformations.

The existing CAD/CAM system may where necessary be complemented by information specific to the "welding robot" application.

The geometric database is filled by the CAD/CAM interface programs and consulted by the work task preparation and/or simulation programs. It contains geometrical, topological and welding information extracted from the CAD/CAM system, on all elements (plates, profiled sections, gussets, etc) enabling the block to be reconstituted in three dimensions (3D).

The computer programs describing the robot-carrier combinations 204 provide for defining the morphology and kinematics of the combinations used. The information thus generated is stored in a so-called "robot description database" 205.

The morphology of welding equipment is described by assembling standard geometrical volumes, e.g., parallelepiped, frustum of a cone, and the like constituting the tool, the arms, the carrier. A descriptive computer language is available to the preparer.

The description of the kinematics provides for graphical representation of changing movements of a robot-carrier combination. It takes into account the capacities of all degrees of freedom and the laws which govern each articulation.

The robot-carrier combination descriptive database is filled in by the robot-carrier description programs and consulted by the simulation software. This database contains all geometrical and kinematic information on all constituent parts of the various combinations which can be used.

The work standard description programs 206 enable standardised links between the different types of parameters to be established from tables. The information thus generated is stored in a so-called "work standards database" 207.

Standard relations are established by hierarchical links between the various parameters, according to laws usually employed in shipbuilding working methods.

These relationships are standardised but not fixed. The programs provide for modifying or replacing one or more parameters of the hierarchical link according to specific requirements.

The work standards database is filled in by the standards description programs and consulted by the work sequence preparation programs. All information defining the standardised relationships between the different types of parameters is stored in it.

Work tasks are prepared on the basis of a three-dimensional graphical representation 208 of the block to be processed. This graphical representation includes all the elements of the block, i.e., plates, profiled members, gussets, uprights, and the like. No lines are omitted, being represented in dashed form where hidden. The graphical facilities provided include enlargement, rotation, interactivity and selective increased brightness.

The programs for preparing work tasks to be carried out by the robots provide for the implementation and chaining of the following operations.

Figure 12:
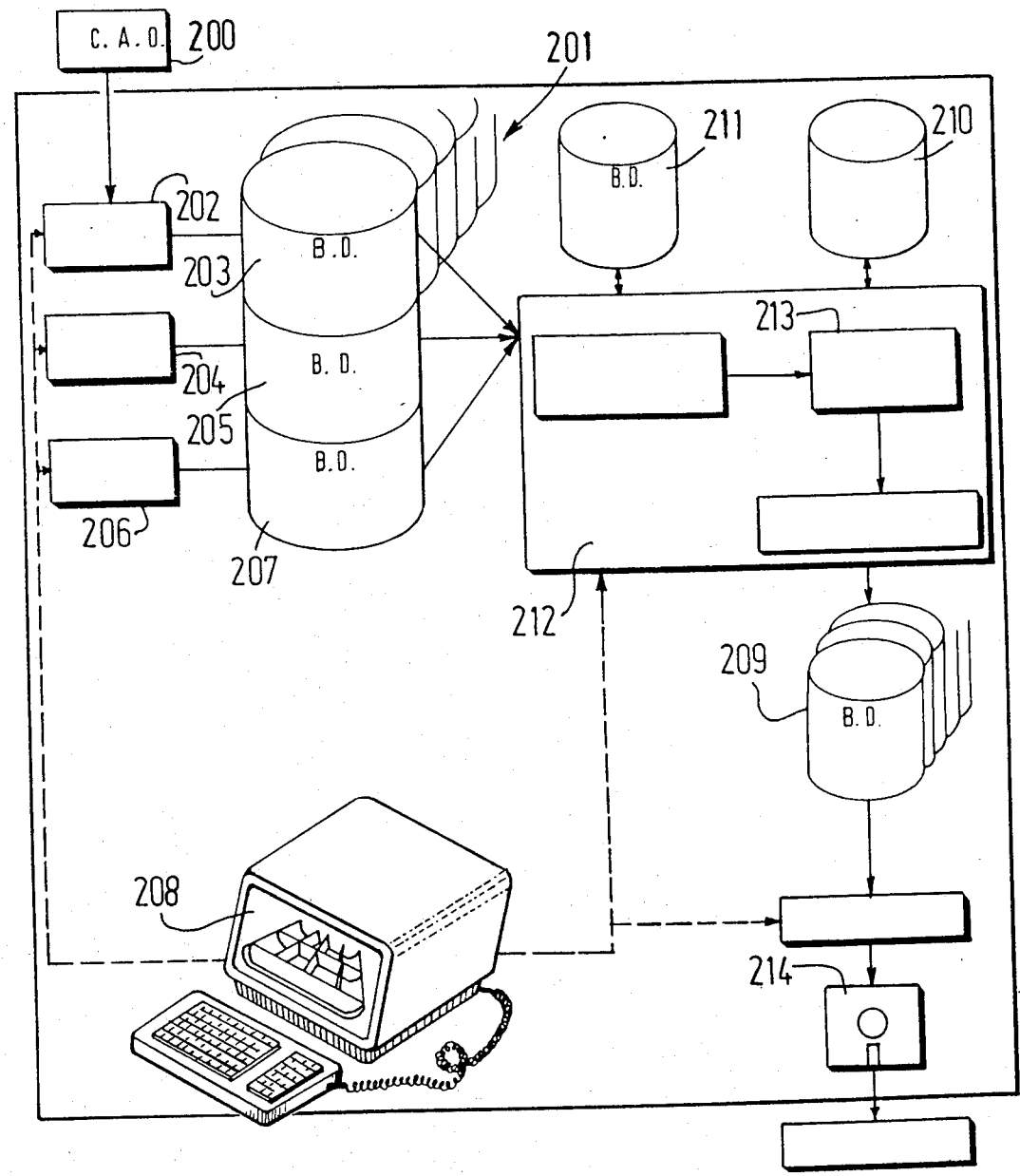
FIG. 12 is a functional block diagram of the programming centre.

The database 209 for the initiation of the work sequence incorporates transmission into the database of the identification of the block to be welded in the form of an operator message transmitted to the supervisory station,(see FIG. 12), on a hard medium e.g., a floppy disk 214, or directly.

The same principle is used to transmit the list of the resources provided by the preparation stage for the implementation of the work sequences and the signature of the block, e.g., by sensors or visual observation by the operator.

Implementation of the positioning of the block as it is presented in the workshop is based on the possiblities of the graphics software (turning, for example). The results are transmitted to the "work sequence" database 209 and then to the supervisory sttion for verification of the position of the block in the workshop under preparation.

Indexing points define the position of the sensors (ultrasonic, infrared, and the like which provide for locating the block in the workshop. Recognition of the reference system associated with the block in the reference system associated with the workshop enables the supervisor to detect the position of the block and to carry out all necessary transformations on the geometrical definitions of the elements such as plates, profiled members, and the like.

There is a priority system for the positioning of these three elements (joints, links, etc).

The compartment or cell is the basic entity of the block. It is delimited by plates or profiled members and defined at the preparation stage. Accordingly, the cell delimits the working area of a robot by means of boundaries. All the cells thus defined in a block are identified by their listed boundaries. The list of cells is transmitted to the preparer for checking the preparation of sequences for the entire block and to assist in scheduling the operation is to be performed on the block.

The selected cell in the block is extracted visually from the three-dimensional graphical representation of the block using a boxing method. Information on the compartment dimensions is indicated on the screen. After this operation has been carried out, the program establishes a list of all areas to be processed in the cell and associates with each the parameters provided by the CAD/CAM (SICEN) system. Subsequently, an area is extracted and processed on the basis of the three-dimensional graphical representation of the compartment and may be selected by means of a data entry light pen. Its graphical definition appears with increased brightness. Its identification in the list of joints in the compartment must be distinct from the other identifications.

A welded joint is selected by designating the departure point of the weld bead to be executed.

On the one hand, the program must automatically deduce the working environment from the geometrical database 203. Accordingly, such information appears on the screen to provide for possible correction of this environment at the initiative of the preparer, while on the other hand, and on the basis of information stored in the work standards database 206, the program deduces the standard set of parameters to be assigned to the selected area which also appears on the graphics screen and may be modified where necessary.

All the information thus generated is stored in the work sequence database 209. In addition, a "statistical control" database 210 is fed with new information such as times, lengths, and similar data. Also, a "work sequence standard" database 211 is also updated.

Verification and organisation of the sequences for all areas of the compartments are effected by software. This enables the preparer to verify that all areas to be processed by the robots are work on and to organise the logical chaining of work sequences, as appropriate to the methods used, by designating areas. Accordingly, the databases 209, 210 and 211 are updated and fed with information produced in this way.

The choice of a robot-carrier combination is predicated by the database containing descriptions of these combinations and the dimensions of the compartment to be processed. Once chosen, this combination is positioned optimally in the compartment. Thus, the program must carry out all calculations needed to determine whether the dimensions of the combination selected and those of the compartment are compatible. After these operations have been carried out, the information defining the combination selected, its position and its orientation is stored in the work database of the block.

The sequence access trajectories are the trajectories followed by the combination. They provide for a rapid approach to the work start position. In those situations where obstacles have to b circumvented, the preparer or programmer adapts the standardised trajectories previously defined and parameterised in order to link the areas. Once these operations have been carried out, the program verifies all links between areas.

Simulation and verification of execution provide for verification of movements of the combination executing the sequences previously established for a compartment. On the one hand, this provides for detection of any potential collisions and inaccessible areas and, on the other hand, it significantly reduces the time for which the robots are immobilised in the workshop and ensures totally safe working conditions. The system in accordance with the present invention permits the sequences to be modified in accordance with information from the simulation program. After this verification has been carried out, the "block welding" database is updated to the definitive state for the compartment. The "statistical control" and "standard sequence" databases are updated if necessary.

When all the cells have been processed, the preparer uses computer aids to verify that all compartments have been processed and to effect their scheduling. The "statistical control" and "block welding" databases are enriched with this information. The "work sequence standards" database is filled in by the preparer when preparing the welding sequence used for a compartment. It stores all work sequences regarded as standard.

These standardised sequences are used either for other areas or for other compartments of similar topology. They may be used from one block to another.

The "statistical control" database contains full information concerning:

(a) the number of working areas, (b) the characteristics of the working areas (length, surface area, etc) in a block (multi-passes inclusive) for a given ship, (c) the execution times per compartment, per block for a given ship, (d) the working times, (e) the mean time between failures.

This database is subject to change, the above list of information not being exhaustive.

The "work" database is filled in by the preparation, simulation and scheduling programs and consulted by the command generation program and the formatting program. It stores all the information described previously.

The commands which can be executed by the supervisor for one block are as follows:

commands for generating messages on the robot console for:

(i) verifying conformity of the block (by signature and/or identification), (ii) verifying the positioning of the block in the workshop, (iii) verifying the presence of all resources required for carrying out welding tasks, (b) commands for initialising the carrier (indexing), (c) commands for positioning the welding apparatus and uncoupling, (d) commands for executing sequences per block of information providing for restarting after halting where necessary, (e) commands to enable the transport means to take up the welding apparatus and position it in a neighbouring compartment, taking due account of necessary constraints (inaccessible compartments), (f) generation of a graph of the compartment to provide for scheduling of the tasks of the welding apparatus.

Implemented in this way, the programming center fulfills the following objectives:

(a) it relieves the supervisor station of all work sequence design tasks, (b) it provides for working in masked time, (c) it provides for maximum verification before execution of tasks in the workshop, (d) it provides for circumventing the problem of the specific robot language.

From the foregoing description, one skilled in the art can easily ascertain the essential characteristics of this invention and, without departing from the spirit and scope thereof, make various changes and modifications of the invention to adapt it to various uses and conditions.

We claim:

1. An automated mobile workshop comprising:
   (a) a workstation equipped with at least one tool for performing work;
   (b) means for transporting said workstation from one location to another location operably connected to said workstation;
   (c) means for sensing the environment of said workstation in operable communication with said workstation for detecting the location of said workstation;
   (d) a programming center for receiving and storing information relating to objects on which work is to be performed and descriptions of the capabilities of tools available to perform the work, said programming center being in electronic communication with said workstation and including:
      (i) a database for receiving and storing data relating to objects on which work is to be performed;
      (ii) a database provided with technical specifications for said at least one tool; and
      (iii) a database containing standards for work to be performed;
   (e) a supervisory station electronically connected to said programming center, said means for transporting, and said means for sensing for receiving programmed information from said programming center, detecting the presence of said at least one tool, and for communicating instructions to said means for transporting based on said programmed information;

(f) a work preparation station electronically connected to said programming center for preparing a work sequence corresponding to data relating to objects on which work is to be performed, said work preparation station including:
  (i) visual simulation facilities for depicting said objects; and
  (ii) a database for receiving and storing data regarding said work sequence;

(g) a database electronically connected to said supervisory station and said database for receiving and storing data regarding said work sequence for receiving and transmitting said data regarding said work sequence to said supervisory station;

(h) a statistical control database electronically connected to said database for receiving and storing data regarding said work sequence and to said work preparation station.

2. The automated mobile workshop in accordance with claim 1, wherein said objects include a ship composed of at least one block including a plurality of chambers.

3. The automated mobile workshop in accordance with claim 1, wherein said programming center includes a master microcomputer and said supervisory station comprises a slave microcomputer linked to said master microcomputer.

4. The automated mobile workshop in accordance with claim 3, wherein said workstation includes a robot comprising an articulated arm having a plurality of axes of rotation provided with drive means, said arm having one end fitted to said at least one tool, and another end fixed to a carrier equipped with means for attaching to said object; and wherein said means for transporting includes a crane, said carrier and said crane being interconnected by a means for linking said carrier to said crane, so as to enable said carrier with said arm to be moved from one location to another location.

5. The automated moble workshop in accordance with claim 4, further comprising means for controlling and supplying power to said drive means and said tool.

6. The automated mobile workshop in accordance with claim 4, wherein said carrier comprises an arch having uprights positioned on either side of said arm.

7. The automated mobile workshop in accordance with claim 6, wherein said carrier further comprises a rotatable base on which said arch is mounted.

8. The automated mobile workshop in accordance with claim 7, wherein said carrier further comprises a plate having an upper surface on which said base is rotatably mounted and a lower surface connected to said means for attaching.

9. The automated mobile workshop in accordance with claim 8, wherein said carrier further comprises means for protecting said arm positioned adjacent said arm.

10. The automated mobile workshop in accordance with claim 8, wherein said means for protecting includes a bell-shaped member adapted to cover said carrier and said robot including said arm.

11. The automated mobile workshop in accordance with claim 10, wherein said means for linking includes a vertically rotatable holder connected to a carriage associated with said crane, to which said bell-shaped member is fastened.

12. The automated mobile workshop in accordance with claim 11, wherein said holder is provided with a stabilizer composed of a horizontal axis gyroscope and means for rotating said holder about a vertical axis relative to said stabilizer so as to orient said holder.

13. The automated mobile workshop in accordance with claim 12, wherein said holder further includes disconnectable means for connecting to a winder for supporting the connecting means linking said means for controlling and supplying power to the tool of the robot arm.

14. The automated mobile workshop in accordance with claim 13, wherein said carrier is composed of two parts, one adapted to be fixed relative to said object and the other adapted to move along the former.

15. The automated mobile workshop in accordance with claim 14, wherein said holder moves in small steps which are compensated by appropriate movement of said arm.

16. The automated mobile workshop in accordance with claim 15, wherein the supervisory station comprises means for controlling and storing computer programs and said means for controlling and storing computer programs of said supervisory station and the workshop are provided by a single common processor colocated with said means for controlling and storing, the robot arm and its carrier comprising coders-decoders, with the necessary electrical and mechanical means and their direct power control lines being connected to said coders-decoders.

* * * * *

UNITED STATES PATENT AND TRADEMARK OFFICE
CERTIFICATE OF CORRECTION

PATENT NO. : 4,697,239

DATED : September 29, 1987

INVENTOR(S) : Claude SICARD et al.

Page 1 of 4

It is certified that error appears in the above-identified patent and that said Letters Patent is hereby corrected as shown below:

At column 1, line 24 insert ---,--- after "manufactured".

At column 1, line 37 insert ---of--- after "ships are".

At column 1, line 41 change "organisation" to ---organization---.

At column 1, line 49 change "reltively" to ---relatively---.

At column 1, line 58 change "using those achieved with" to ---with those achieved using---.

At column 2, line 1 change "characterised" to ---characterized---.

At column 2, line 10 insert ---,--- after "constructed".

At column 2, line 15 change "said" to ---such ---.

At column 2, line 19 change "ad" to ---and---.

At column 2, line 19 change "the programs" to ---such programs---.

At column 2, line 36 change "prevention" to ---provision---.

At column 2, line 45 delete "aforementioned".

At column 2, line 65 insert "a" before "workshop".

At column 4, line 29 change "comprosed" to ---composed---.

At column 4, line 45 change "initialisation" to ---initialization---.

UNITED STATES PATENT AND TRADEMARK OFFICE
CERTIFICATE OF CORRECTION

PATENT NO. : 4,697,239                          Page 2 of 4

DATED      : September 29, 1987

INVENTOR(S): Claude SICARD et al.

It is certified that error appears in the above-identified patent and that said Letters Patent is hereby corrected as shown below:

At column 5, line 4 delete "," after "minimizes".
    At column 6, line 9 change "for" to ---or---.
    At column 6, line 20 change "beam 18" to ---beam 19---.
    At column 6, line 34 change "rm" to ---arm---.
    At column 7, line 23 change "immobilise" to ---immobilize---.
    At column 7, line 39 insert "a" before "preferred".
    At column 7, line 53 insert "or" after "fastening".
    At column 8, line 14 change "stabilizer" to ---stabilizer---.

At column 9, line 59 delete "),".
    At column 9, line 60 delete "(".
    At column 9, line 67 change "centre" to ---center---.
    At column 10, line 8 delete ")".
    At column 10, line 13 change "centre" to ---center---.
    At column 10, line 17 change "centre" to ---center---.
    At column 10, line 27 change "centre" to ---center---.
    At column 10, line 52 delete ")".

UNITED STATES PATENT AND TRADEMARK OFFICE
CERTIFICATE OF CORRECTION

PATENT NO. : 4,697,239

DATED : September 29, 1987

INVENTOR(S) : Claude SICARD et al.

It is certified that error appears in the above-identified patent and that said Letters Patent is hereby corrected as shown below:

At column 11, line 39 change "standarised" to ---standardized---.
At column 11, line 46 change "standarised" to ---standardized---.
At column 11, line 53 change "standarised" to ---standardized---.
At column 12, line 13 change "sttion" to ---station---.
At column 12, line 17 insert ---)--- after "like".
At column 13, line 1 change "organisation" to ---organization---.
At column 13, line 4 change "work on" to ---worked on---.
At column 13, line 4 change "organise" to ---organize---.
At column 13, line 24 change "b" to ---be---.
At column 13, line 25 change "standardised" to ---standardized---.
At column 13, line 35 change "immobilised" to ---immobilized---.

UNITED STATES PATENT AND TRADEMARK OFFICE
CERTIFICATE OF CORRECTION

PATENT NO. : 4,697,239

DATED : September 29, 1987

INVENTOR(S) : Claude SICARD et al.

It is certified that error appears in the above-identified patent and that said Letters Patent is hereby corrected as shown below:

At column 14, line 6 insert ---a) --- before "commands".

At column 15, line 46 change "moble" to --- mobile---.

Signed and Sealed this

Eighteenth Day of October, 1988

*Attest:*

DONALD J. QUIGG

*Attesting Officer*   *Commissioner of Patents and Trademarks*